United States Patent [19]

Dakss et al.

[11] 4,269,648
[45] May 26, 1981

[54] METHOD FOR MOUNTING MICROSPHERE COUPLING LENSES ON OPTICAL FIBERS

[75] Inventors: Mark L. Dakss, Sudbury; Bumman Kim, Burlington; John Schlafer, Wayland, all of Mass.

[73] Assignee: GTE Laboratories Incorporated, Waltham, Mass.

[21] Appl. No.: 128,777

[22] Filed: Mar. 10, 1980

[51] Int. Cl.³ ............................................... G02B 5/14
[52] U.S. Cl. ................................... 156/293; 350/96.18
[58] Field of Search ................. 156/60, 99, 108, 279, 156/293, 296; 65/37, 59 A, 59 B; 350/96.10, 96.15, 96.18, 96.20, 96.34, 178, 319

[56] References Cited

U.S. PATENT DOCUMENTS 4,118,270  10/1978  Pan et al. .......................... 350/96.18

FOREIGN PATENT DOCUMENTS 2002136  2/1979  United Kingdom ................. 350/96.18

OTHER PUBLICATIONS

J. C. Marinace, "Electrical Positioning of Lenses on Semiconductor Lasers", IBM Tech. Disclosure Bulletin, vol. 19, No. 5, Oct. 1976, p. 1948.

*Primary Examiner*—Caleb Weston

[57] ABSTRACT

A microsphere bead coupling lens can be mounted onto an end of an optical fiber after the end is initially prepared by cleaning and cleavage. An adhesive is first applied to the cleaved end. The applied adhesive end of the optical fiber is then approximately centered over a microsphere bead to be mounted. The fiber is lowered until the adhesive on the end contacts the bead. The fiber is then raised whereby the adhesive on the end holds onto the bead by surface tension so that the bead gets picked up as the fiber is raised; and, due to the combination of surface tension and gravity, the bead lens is moved by the adhesive until the lens is aligned with, or very close to, the central axis of the fiber. Subsequently, the adhesive on the fiber end is cured by means such as ultraviolet-curing or heat-curing.

11 Claims, 8 Drawing Figures

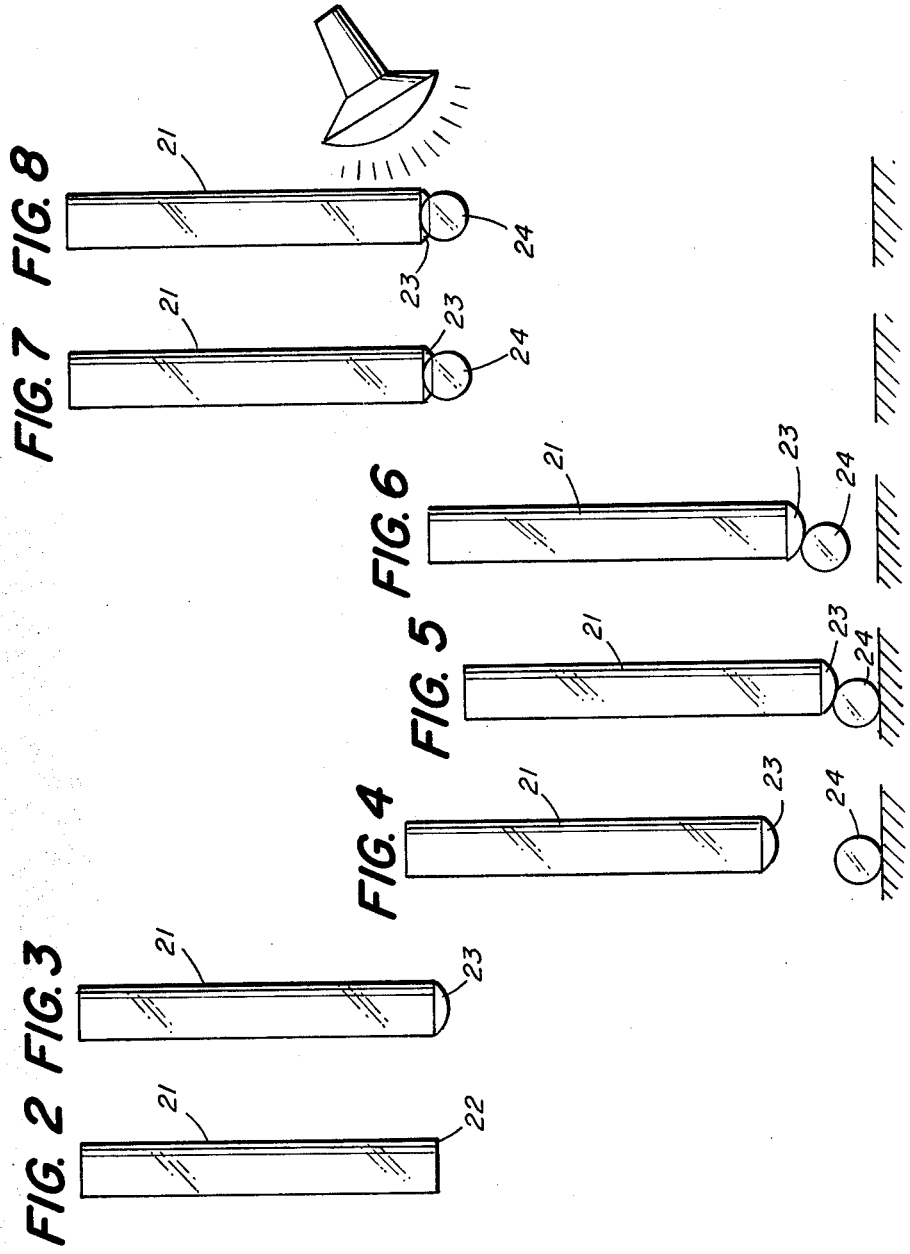

METHOD FOR MOUNTING MICROSPHERE COUPLING LENSES ON OPTICAL FIBERS

BACKGROUND OF THE INVENTION

1. Field of the Invention

This invention relates to a method for mounting a microsphere coupling lens on an optical fiber, especially for providing the efficient coupling of light to the fiber. Accordingly, it is a general object of this invention to provide new and improved methods of such character.

2. Description of the Prior Art

The combination of spherical lenses with optical fibers, or, specifically, the use of microsphere bead lenses for diode laser-to-laser coupling, has been discussed in the prior art in various printed publications. Some of these printed publications include:

G. D. Khoe and L. J. Meuleman, "Light modulation and injection in optical-fibre transmission systems with semiconductor lasers", *Philips Tech. Rev.* 36 (1976), pp. 201–204, discusses the coupling of glass fibers to lasers. A spherical lens is inserted in front of the entrance plane of a glass fiber. The lens converges laser light to an almost parallel beam, mainly incident within the acceptance angle of the fiber. The core of the fiber and its cladding are housed within a glass capillary tube. The lens is cemented to the capillary tube.

G. D. Khoe and G. Kuyt, "A Luneberg lens for the efficient coupling of a laser diode and a graded-index fibre", *Proc. of the 3rd European Conference on Optical Communication,* Munich, September 1977, pp. 176–178, states that glass beads can be glued on the fibers using a simple tool.

G. K. Khoe and G. Kuyt, "Realistic efficiency of coupling light from GaAs laser diodes into parabolic-index optical fibres", *Electronic Letters*, Vol. 14 (1978) pp. 667–669, states that microscopic glass beads are glued on the fiber end of graded-index fibers using U.V.-cured epoxy. A stated advantage of microbeads (over cylindrical lenses) is that orientation is arbitrary.

G. D. Khoe, H. G. Kock, and L. J. Meuleman, "Fiberless hermetic packaged lens-coupled laser diode for wideband optical-fiber transmission", *Proc. Topical Mtg. On Opt. Fiber Communication,* Washington, D.C., March 1979, pp. 94–97, discusses an optical configuration derived from the foregoing scheme in which a glass bead with a high refractive index is glued on the inside glass window of a modified TO-15 package. The position of the window with the lens on it is then adjusted to a laser. A bright spot of the laser is displayed in combination with a circular pattern originating from the microlens. Proper transverse alignment is obtained by adjusting the bright spot to the center of the pattern. Then, the cap is welded to the base.

Microsphere bead lenses are desirable in that they can produce as high as 65% to 80% coupling efficiencies (which are among the highest of various coupling techniques that are presently available). Such lenses provide for laser-lens alignment tolerances that are workable in production.

For a multimode fiber, a microsphere bead coupling lens has a typical diameter in the range of 60 microns to 125 microns and is usually made of glass (having an index $n_c$ up to 1.91). The bead is attached to the end of an optical fiber with a transparent adhesive such as a transparent epoxy. The bead acts as a lens which directs widely diverging rays from the laser into the fiber core at an angle that is within the fiber's acceptance angle. Thus, it can be an efficient coupling lens.

However, to achieve a reproducibly high coupling efficiency with such a lens, the bead must be very well centered on the end of the fiber, usually to within 5 microns. Preferably, in its mounting, the epoxy must not run over onto the front or laser-facing bead surface. The lens, preferably, should end up close to the fiber, i.e, within a few microns.

SUMMARY OF THE INVENTION

Another object of this invention is to provide for a new and improved, simple, accurate, and practical technique for mounting a microsphere bead coupling lens on the end of an optical fiber.

Still another object of this invention is to provide for a new and improved method for mounting a microsphere bead coupling lens on the end of an optical fiber which is workable under production conditions and which yields lenses having reproducibly high efficiencies.

In accordance with one embodiment of the invention, a method for mounting a microsphere bead coupling lens on an end of an optical fiber includes applying an adhesive to the end. The applied adhesive end of the optical fiber is then approximately centered over the bead to be mounted. The fiber is then lowered until the adhesive on the end contacts the bead. The fiber is raised, whereby the adhesive on the end holds onto the bead by surface tension, so that the bead gets picked up as the fiber is raised; and, due to the combination of surface tension and gravity, the bead lens is moved by the adhesive until the lens is aligned with, or very close to, the central axis of the fiber. In accordance with certain features of the invention, the adhesive on the fiber end can be subsequently cured. The adhesive on the fiber end can be cured by ultraviolet-curing or by heat-curing. The adhesive can be an epoxy. Initially, the fiber end can be prepared by cleaning and cleaving. The microsphere bead can have a diameter in the range of 60 microns to 125 microns and the bead can be centered to within 5 microns, preferably, within 3 microns or, even more desirably, within 1.5 microns. Specifically, the bead can have a diameter in the range of 75 microns to 95 microns.

BRIEF DESCRIPTION OF THE DRAWINGS

Other objects and advantages of this invention, together with its construction and mode of operation, will become more apparent from the following description, when read in conjunction with the accompanying drawing, in which:

FIGS. 2 through 8 are a series of views illustrating a method in accordance with one embodiment of this invention.

DESCRIPTION OF PREFERRED EMBODIMENTS OF THE INVENTION

Figure 1:
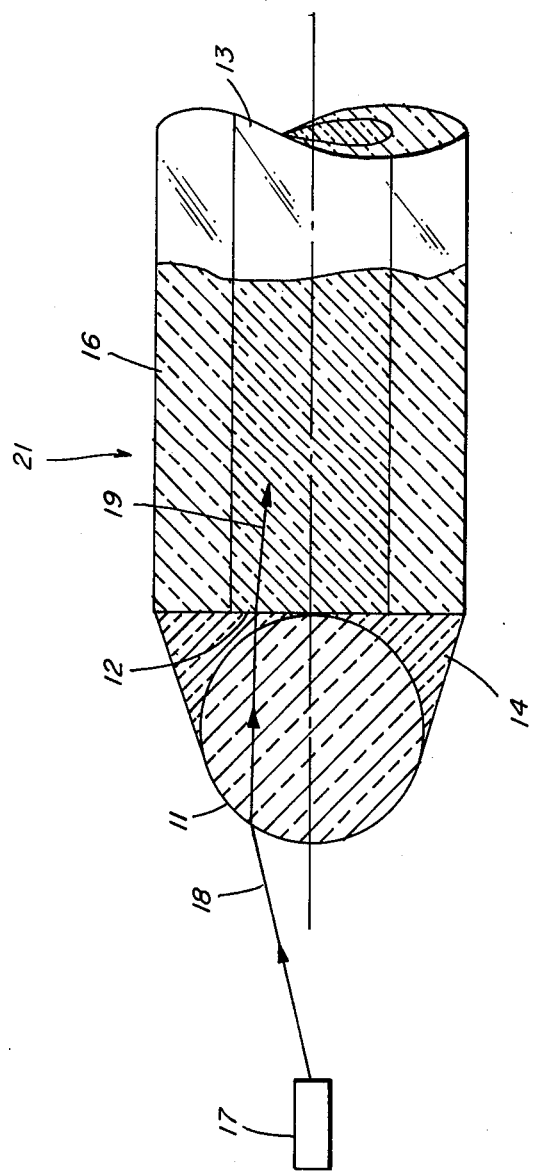
FIG. 1 is a cross-sectional view of a mounted microsphere bead coupling lens in association with an optical fiber.

Referring to FIG. 1, there is depicted a laser-to-fiber coupler using a glued-on spherical bead lens. A microsphere bead coupling lens 11, having a typical diameter in the range of 60 microns to 125 microns and usually made out of glass, for example, of index $n_c$ up to 1.91, is attached to the end 12 of a fiber 21 with an adhesive such as epoxy glue 14. The fiber core 13 of the fiber 21 can be surrounded by a cladding 16 having a different index of refraction. As shown in FIG. 1, light from a laser 17 is directed along a path 18 to the bead 11 which directs the widely diverging rays from the laser 17 into the fiber core 13 at an angle along a path 19 that is within the acceptance angle of the fiber core 13.

The improved ball lens mounting technique, in accordance with this invention, is described in accordance with FIGS. 2 through 8, inclusive. Initially, a fiber 21 has its end 22 prepared by cleaning and cleaving so as to provide a good cleaved end fiber (FIG. 2).

As depicted in FIG. 3, the fiber end 22 has epoxy or other transparent adhesive 23 affixed thereto, through such methods as dipping.

Referring to FIG. 4, with the aid of micromanipulators and a low power microscope, the adhesive dipped end 23 of the fiber 21 is approximately centered over a microsphere ball lens (to about 25 microns) and lowered so that the epoxy 23 contacts the bead 24 as shown in FIG. 5.

The epoxy 23 then holds onto the bead 24 by surface tension so that the bead 24 gets picked up as the fiber 21 is moved upwards, as shown in FIGS. 6 and 7. Due to the combination of surface tension and gravity, the bead lens is moved by the adhesive 23 until the bead lens 24 is on, or very close to, the axis of the fiber 21, as shown more particularly in FIG. 7. Thus, the technique can be called a self-centering technique.

The foregoing method has been performed many times using a variety of different ultraviolet-curing or heat-curing adhesives (as shown in FIG. 8). Typical adhesives can be Epotek 301 and Epotek 202, commercially available from Epoxy Technology Company, Billerica, Mass. and Loctite 345, commercially available from Loctite Company, Newington, Conn. (the preferred epoxy contemplated by the applicant is Epotek 202).

The adhesive, preferably, is cured by placing the fiber, with the adhesive held microsphere, into an oven at 60° C. for one hour.

As stated above, the bead sizes can be typically in the 75 microns to 95 microns diameter range. In over 50% of over 30 samples tested, centering was to 1.5 microns or better. In all but one or two cases, it was to within 3 microns. In the remaining one or two cases, it was to within 5 microns, a value that is still acceptable for many applications.

The foregoing self-centering method can be utilized when fabricating diode laser packages in a production facility. By practicing the foregoing invention, microsphere lenses have a practical use and they have led to a substantial increase in coupling efficiency over previous type lenses. It is also a very workable method in a production environment.

The foregoing invention has various advantages over the prior art. It is more workable in a production environment. It produces much higher quality lenses because it centers the ball lens to a much greater degree of accuracy. It is a much faster technique to carry out. It is a safer technique since it does not require the use of a laser beam. It requires much less expensive equipment in that no lasers and no high-precision micromanipulators are required. It is very simple to carry out. It is more reproducible than other techniques while requiring less judgment. It eliminates the difficult and environmentally sensitive task of holding the microsphere.

There is no need to prepare the other fiber end. Though a microscope is used for observation to approximately center the fiber over the bead, the microscope is utilized in any event to check the bead for suitability.

Various modifications can be performed without departing from the spirit and scope of this invention. For example, this method can be performed with many different types of adhesives, such as air-drying, heat-cured, and ultraviolet-cured adhesives. The method can be performed with many different sizes and types of microsphere beads including plastic and glass. Other symmetrical bead shapes, such as a cube or a hemisphere, can also be utilized with this invention. Symmetrical, but non-circular fibers, for example, square or elliptical ones, can have microsphere beads mounted thereon by this method. In accordance with this invention, when the adhesive that is used is so viscous that bead motion is hampered, vibration can be applied to the fiber to assist in moving the bead to the center axis of the fiber. Furthermore, other applications can utilize this invention where a symmetrical microbead is to be attached on the end of a thin symmetrical rod in a centered fashion.

What is claimed is:

1. A method for mounting a microsphere bead coupling lens on an end of an optical fiber comprising
    applying an adhesive to said end;
    approximately centering the applied adhesive end of said optical fiber over the bead to be mounted;
    lowering said fiber until the adhesive on said end contacts said bead; and
    raising said fiber, whereby
        the adhesive on said end holds onto said bead by surface tension so that said bead gets picked up as said fiber is raised, and
        due to the combination of surface tension and gravity, said bead lens is moved by said adhesive until said lens is aligned with, or very close to, the central axis of said fiber.

2. The method as recited in claim 1 further comprising a subsequent step of curing said adhesive on said fiber end.

3. The method as recited in claim 2 wherein said adhesive on said fiber end is ultraviolet-cured.

4. The method as recited in claim 2 wherein said adhesive on said fiber end is heat-cured.

5. The method as recited in claim 1 wherein said adhesive is an epoxy.

6. The method as recited in claim 2 wherein said adhesive is an epoxy.

7. The method as recited in claim 1 including an initial step of preparing said end by cleaning and cleaving.

8. The method as recited in claim 1 wherein said bead has a diameter in the range of 75 microns to 95 microns, and wherein said bead is centered to within 1.5 microns.

9. The method as recited in claim 1 wherein said bead has a diameter in the range of 60 microns to 125 microns, and wherein said bead is centered to within 5 microns.

10. The method as recited in claim 9 wherein said bead is centered to within 3 microns.

11. The method as recited in claim 9 wherein said bead is centered to within 1.5 microns.

* * * * *